(12) United States Patent
Hayward et al.

(10) Patent No.: US 10,623,092 B2
(45) Date of Patent: *Apr. 14, 2020

(54) METHOD AND APPARATUS FOR DETECTING A DISTURBANCE IN A MEDIUM USING THRESHOLD BASED DETECTION

(71) Applicant: AT&T Intellectual Property II, L.P., Atlanta, GA (US)

(72) Inventors: Justin Hayward, Southampton (GB); Andrew B. Lewis, Bristol (GB); Stuart Russell, Southampton (GB)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,344

(22) Filed: Aug. 29, 2019

(65) Prior Publication Data

US 2019/0386740 A1 Dec. 19, 2019

Related U.S. Application Data

(63) Continuation of application No. 15/673,852, filed on Aug. 10, 2017, now Pat. No. 10,454,573, which is a
(Continued)

(30) Foreign Application Priority Data

Oct. 13, 2006 (GB) .................................. 0620257.6

(51) Int. Cl.
*H04B 10/071* (2013.01)
*G01D 5/353* (2006.01)
(Continued)

(52) U.S. Cl.
CPC ........... *H04B 10/071* (2013.01); *G01D 5/353* (2013.01); *G01D 5/35358* (2013.01);
(Continued)

(58) Field of Classification Search
CPC .. H04B 10/071; G01H 9/004; G01D 5/35364; G01M 11/3127; G01M 11/3172
See application file for complete search history.

(56) References Cited

U.S. PATENT DOCUMENTS

| 4,531,833 A | 7/1985 | Ohtomo |
| 4,653,916 A | 3/1987 | Henning et al. |

(Continued)

FOREIGN PATENT DOCUMENTS

| EP | 0178814 A2 | 4/1986 |
| EP | 0348021 A2 | 12/1989 |

(Continued)

OTHER PUBLICATIONS

Dakin et al., "Novel Optical Fibre Hydrophone Array Using a Single Laser Source and Detector," Electronic Letters, vol. 20, No. 1, Jan. 5, 1984, pp. 53-54.

(Continued)

*Primary Examiner* — Michael P LaPage
(74) *Attorney, Agent, or Firm* — Chiesa Shahinian & Giantomasi PC

(57) ABSTRACT

An improved technique for acoustic sensing involves, in one embodiment, launching into a medium, a plurality of groups of pulse-modulated electromagnetic-waves. The frequency of electromagnetic waves in a pulse within a group differs from the frequency of the electromagnetic waves in another pulse within the group. The energy scattered by the medium is detected and, in one embodiment, may be used to determine a characteristic of the environment of the medium. For example, if the medium is a buried optical fiber into which
(Continued)

light pulses have been launched in accordance with the invention, the presence of acoustic waves within the region of the buried fiber can be detected.

20 Claims, 5 Drawing Sheets

Related U.S. Application Data continuation of application No. 14/617,455, filed on Feb. 9, 2015, now Pat. No. 9,768,863, which is a continuation of application No. 12/795,114, filed on Jun. 7, 2010, now Pat. No. 9,148,219, which is a continuation of application No. 11/645,466, filed on Dec. 27, 2006, now Pat. No. 7,764,363.

(51) Int. Cl.
    *G01M 11/00*     (2006.01)
    *G01H 9/00*     (2006.01)

(52) U.S. Cl.
    CPC ........ *G01H 9/004* (2013.01); *G01M 11/3109* (2013.01); *G01M 11/3127* (2013.01)

(56) References Cited

U.S. PATENT DOCUMENTS

| | | |
|---|---|---|
| 4,947,037 A | 8/1990 | Nash et al. |
| 5,194,847 A | 3/1993 | Taylor et al. |
| 5,271,675 A | 12/1993 | Fagan et al. |
| 5,353,110 A | 10/1994 | Jones |
| 5,757,487 A | 5/1998 | Kersey |
| 6,204,920 B1 | 3/2001 | Ellerbrock et al. |
| 6,237,421 B1 | 5/2001 | Li et al. |
| 6,522,797 B1 | 2/2003 | Siems et al. |
| 7,030,971 B1 | 4/2006 | Payton |
| 2001/0013929 A1 | 8/2001 | Torsten |
| 2003/0142319 A1 | 7/2003 | Ronnekleiv et al. |
| 2004/0145798 A1 | 7/2004 | Greene et al. |
| 2004/0149897 A1 | 8/2004 | Tsai et al. |
| 2004/0245441 A1 | 12/2004 | Pieterse et al. |
| 2005/0135253 A1 | 6/2005 | Cai et al. |
| 2005/0146726 A1 | 7/2005 | Balachandran et al. |
| 2005/0196174 A1 | 9/2005 | Evangelides, Jr. et al. |
| 2006/0028636 A1 | 2/2006 | Payton |
| 2007/0171400 A1 | 7/2007 | Payton |
| 2008/0278711 A1* | 11/2008 | Sikora ................ G01M 11/3181 356/73.1 |
| 2008/0297772 A1 | 12/2008 | Rogers et al. |
| 2010/0008215 A1 | 1/2010 | Shaw et al. |

FOREIGN PATENT DOCUMENTS

| | | |
|---|---|---|
| GB | 2126820 A | 3/1984 |
| GB | 2165118 A | 4/1986 |
| GB | 2222247 A | 2/1990 |
| WO | 9207236 A1 | 4/1992 |

OTHER PUBLICATIONS

European Search Report dated Feb. 12, 2008 in connection with European patent application No. 07117666.3-2415, 8 pgs.
UK Search Report dated Jan. 22, 2007 in connection with UK patent application No. GB0620258.4, 1 pg.
UK Search Report dated Jan. 22, 2007 in connection with UK patent application No. GB0620257.6, 1 pg.

* cited by examiner

METHOD AND APPARATUS FOR DETECTING A DISTURBANCE IN A MEDIUM USING THRESHOLD BASED DETECTION

This application is a continuation of U.S. patent application Ser. No. 15/673,852, filed Aug. 10, 2017, which is a continuation of U.S. patent application Ser. No. 14/617,455, filed Feb. 9, 2015, now U.S. Pat. No. 9,768,863, which is a continuation of U.S. patent application Ser. No. 12/795,114, filed on Jun. 7, 2010, now U.S. Pat. No. 9,148,219, which is a continuation of U.S. patent application Ser. No. 11/645,466, filed on Dec. 27, 2006, now U.S. Pat. No. 7,764,363, which claims priority to UK Patent Application No. 0620257.6, filed on Oct. 13, 2006, the disclosures of which are incorporated herein by reference in their entirety.

BACKGROUND OF THE INVENTION

The present invention relates generally to sensing signals using multiple pulses of electromagnetic radiation. In a specific embodiment, the invention relates more particularly to acoustic sensing using multiple optical pulses.

The telecommunications industry now uses optical fiber optic cables to form the vast majority of its network backbone. With advances in technology, a single cable bundle can carry many thousands or even millions of telephone conversations. With more recent demands for increased bandwidth for data and Internet traffic, the lack of redundancy within these networks has become a cause for concern. If a link within a network fails, there may be a significant cost to the network operator in both customer dissatisfaction and lost revenue. Such failures may occur, for example, when excavations associated with construction sever an optical fiber cable. Accordingly, the protection of these buried resources is a high priority for network operators. Practices have evolved to protect the fiber when work is scheduled in the vicinity of the fiber. However, unforeseen network failures still occur due to physical damage to the fiber plant.

A buried fiber alarm system that is able to detect and characterize acoustic signatures along the length of a fiber route would serve as a threat warning system for network operators. This would allow operators of the network to take action before critical failure, possibly avoiding damage to the cable entirely. It would also allow network traffic to be rerouted before service was lost. A sensor of this nature would also find application in many wide-ranging fields, such as structural monitoring and the protection of other vulnerable services such as oil and gas transmission pipelines. Furthermore, such a technology would be ideally suited to improvements in perimeter security. A security sensor of this nature would be unobtrusive and, if buried around the perimeter of a sensitive facility, would be virtually impossible to locate and disable. Certain optical sensor configurations would even remain operational if the fiber that is part of the sensor configuration were to be cut around the perimeter, allowing not only the detection of a cut, but also enabling determination of the location of the cut.

Much work has been done in the field of fiber optic based acoustic sensors. Perhaps the most sensitive techniques involve interferometric sensors. However, determining the location of the disturbance, and isolating a section of fiber from a persistent, non-threatening, disturbance, proves difficult due to the nature of these devices. Limited success has however been achieved using loop architectures, but due to the reciprocal nature of the loop configuration multiple disturbances of an unknown nature prove virtually impossible to separate and locate independently. This problem extends to any forward-propagating differential time-delay method.

Perhaps the most useful, truly-distributed, sensing technique employed in the field of fiber sensors is that of optical time-domain reflectometry (OTDR), a schematic representation of which is shown in FIG. 1. A number of varied methods and applications have been disclosed in the literature but the basic distributed scheme involves a short pulse of light, typically 10-1000 ns in duration, which is launched into a fiber, usually a single mode fiber. In FIG. 1, the pulse is launched from source 101, through isolator, 102, switch 103 and coupler 104. As the light propagates along the fiber under test (FUT), 108, a small fraction will be scattered by the tiny random fluctuations in the refractive index of the glass (scatter sites). Some of this scattered light is captured by the fiber and guided back toward the launch end of the fiber. This backscattered light, and its intensity as a function of time and hence distance along the fiber, can then be directly detected by, for example, a PIN diode detector, 105, through coupler 104. The backscattered signal may be recovered and displayed on oscilloscope 106. In FIG. 1, 107 is a device or apparatus to prevent unwanted reflection from the unused port of the 3 dB coupler 104. FIG. 2 is a schematic representation of the backscattered signal showing a discontinuity, 201, associated with optical loss at a splice.

Other detection methods have been disclosed such as optical heterodyne, homodyne and optical amplification methods such as SOA (Solid-state optical amplification) and EDFA (Erbium doped fiber amplification). Unlike optical amplification techniques, optical heterodyne and homodyne methods require a coherent source and hence are termed coherent-OTDR or C-OTDR. Typically, the basic OTDR technique has found application in the measurement and characterization of waveguide features, such as the attenuation of the fiber, splice positions and loss, measurement of reflective markers and the certification of telecommunication installations. A representative C-ODTR technique is shown in FIG. 3. In this FIG, like items from FIG. 1 are labeled as in FIG. 1. The major difference in this technique is that a sample of the launch light and the backscattered light combine at the 3 dB coupler, 104, just before the detectors, 105, resulting in interference at the detectors, 105. A differential detector 109 may then be used to recover the backscatter intensity for exemplary analysis at oscilloscope 106.

In the mid 1980s it was noted that the use of a coherent excitation pulse (i.e. when the coherence length of the source is much greater than the pulse length $T_c$>L) in OTDR raised some interesting issues (Healey, P. "Fading in Heterodyne ODTR", Electronic Letters, 20(1), pg 30, (1984)). It was noted that in the exemplary arrangement of FIG. 3 the backscattered trace is no longer a predictable, logarithmically falling signal, due to fiber loss, but that this predicted trace is modulated by a random variable. This random variable is due in part to the fact that the intensity of the light arriving on the detector at any specific time is the coherent addition of the light scattered from many discrete scatter sites. This "fading" mechanism is comparable to laser speckle, a random interference pattern caused by the interference of light scattering from different positions over the area of a spatially coherent beam. It was also noted that due to mechanical (such as vibration) and temperature changes, this random pattern is altered from pulse to pulse as the distribution of the scatter sites at a given location is also altered. This phenomenon was not exploited for sensing a change in the variables associated with the environment in which the fiber is located.

In U.S. Pat. No. 5,194,847 the same phenomenon is described, and is suggested for use in sensing of strain disturbances along the length of a standard single mode fiber, specifically for the detection of intrusion across a perimeter. In that patent there is described a system that generates a coherent pulse of light from a coherent source. This pulse is then directly launched along the fiber under test. The backscattered radiation is then detected by a square-law detection system, allowing the intensity of the backscattered signal to be observed. By detecting the change in this intensity for a given fiber section, information about the acoustic signal acting on the fiber can be recovered.

In U.S. Patent Publication 20050196174, "a method and apparatus is provided for obtaining status information from a given location along an optical transmission path. The method begins by generating a continuous wave (cw) probe signal having a prescribed frequency that is swept over a prescribed frequency range. The cw probe signal is transmitted over the optical path and a returned C-OTDR signal, in which status information concerning the optical path is embodied, is received over the optical path. A receiving frequency within the prescribed frequency range of the returned C-OTDR signal is detected to obtain the status information. The detecting step includes the step of sweeping the receiving frequency at a rate equal to that of the prescribed frequency. A period associated with the receiving frequency is temporally offset from a period associated with the prescribed frequency." The fading problem discussed above remains in the disclosed method.

In published GB Patent Application 2222247A there is disclosed a "distributed fiber optic sensor system". In the disclosed system, pulses of light which are shifted in relation to one another are transmitted along a fiber. A pulse of light having a first frequency is scattered or reflected from a first location along the optical fiber and combined, after guidance back to a detecting element, with light scattered by the second pulse from a second location along the optical fiber. In addition to the fact that this disclosure states that it involves the analysis of scattering from different sections of a fiber, the publication discloses only a single difference between the frequencies of the first and second pulses.

Although these techniques seem useful, there are several limitations in the disclosed systems. The most crucial limitation is reliability in detecting a threat, since missed detection would cause concern in many applications. The methods described above rely on a statistically random variable. Hence, at a given time, at any given position along the fiber under test, the signal recovered from the coherent addition of scattering from within the pulse has a finite probability of being close to zero. In a real world application this would leave this part of the fiber unprotected. Due to the natural slow drift of the environmental variables, this "faded" fiber section would eventually drift back to a situation where it would again return a signal; however the "black out period" is still a major concern. Another concern is that the signal returned from such a sensor is extremely non-linear and it may be difficult to identify an acoustic disturbance since the acoustic signature is distorted by the generation of harmonics associated with this non-linear response.

Accordingly, there is a need for an improved optical fiber, acoustic detection technique.

BRIEF SUMMARY OF THE INVENTION

The present invention involves an improved electromagnetic-wave, time-domain-reflectometry technique that may be used, in one specific embodiment, to detect acoustic waves in the vicinity of buried optical fibers. In a specific application of the invention, such acoustic waves may foretell impending damage to the buried optical fiber, such as by improper excavation. The technique, in one embodiment, involves launching into a medium, a plurality of groups of pulse-modulated electromagnetic-waves. The frequency separation between the electromagnetic waves in two pulses within a first group is different from the frequency separation between the electromagnetic waves in two pulses within a second group. The energy scattered by the medium is detected and, in one embodiment, may be used to determine a characteristic of the environment in which the medium is located. For example, if the medium is a buried optical fiber into which optical pulses have been launched in accordance with the invention, the presence of acoustic waves within the region of the buried fiber can be detected.

These and other advantages of the invention will be apparent to those of ordinary skill in the art by reference to the following detailed description and the accompanying drawings.

DETAILED DESCRIPTION

Overview

Figure 1:
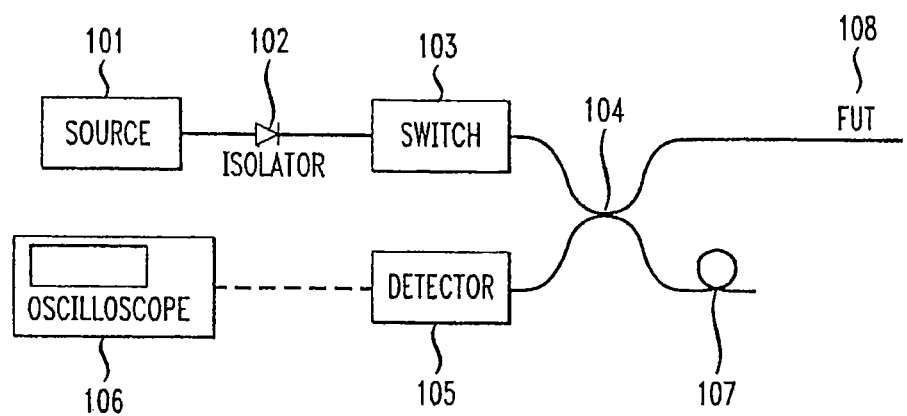
FIG. 1 is a schematic embodiment of a basic ODTR architecture.
Figure 2:
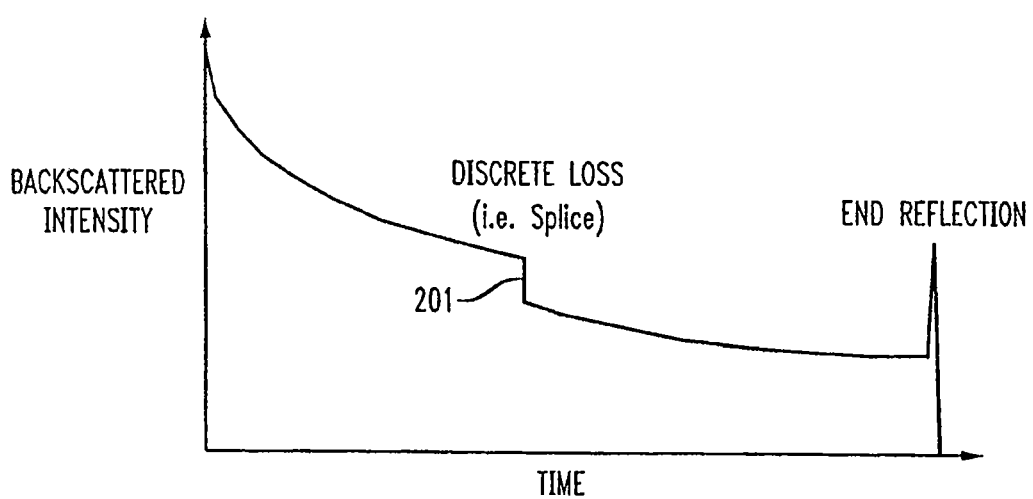
FIG. 2 is a representation of the backscattered intensity in a basic ODTR implementation.
Figure 3:
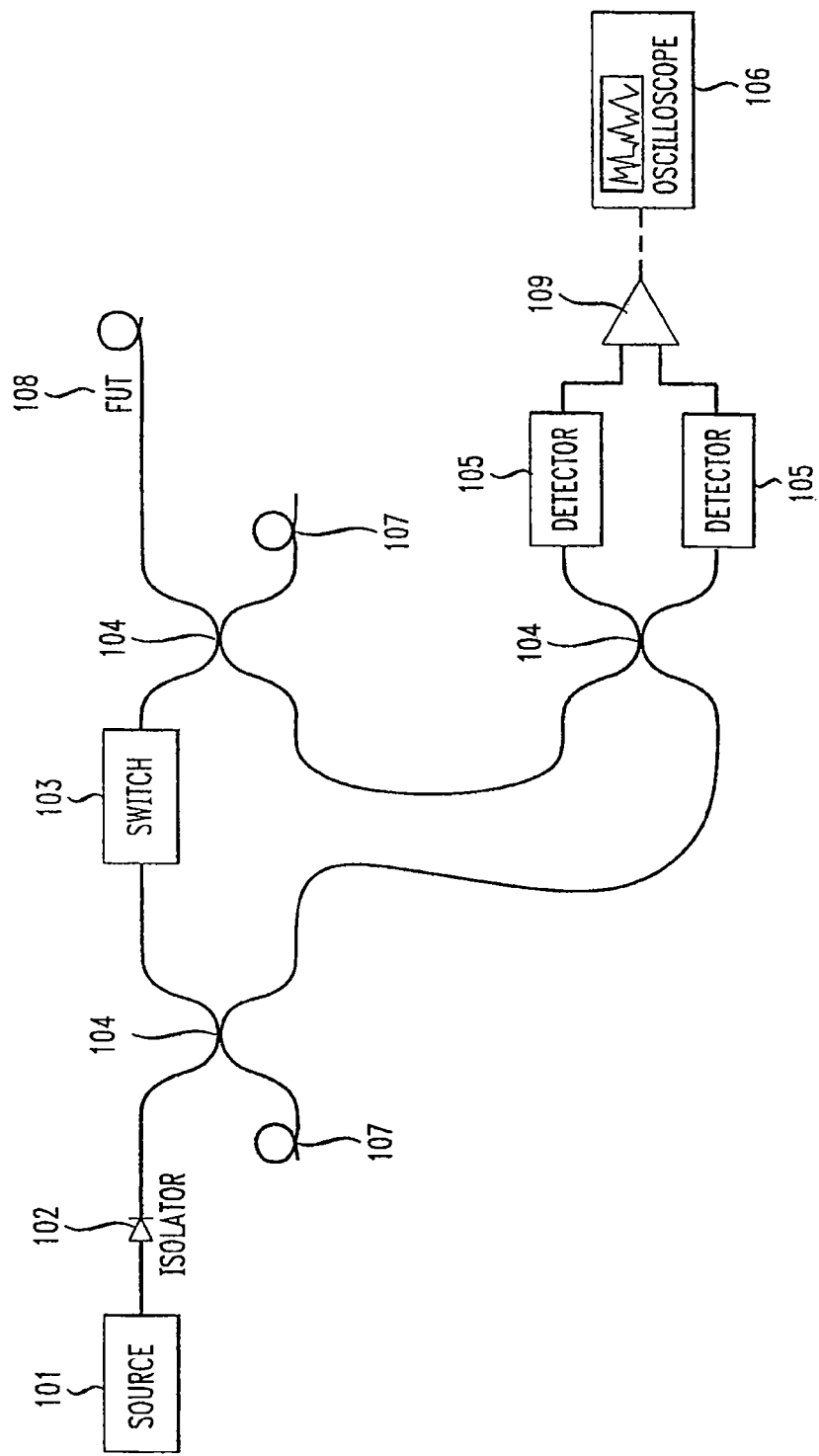
FIG. 3 is a schematic representation of coherent ODTR.

The present invention involves an improved optical time-domain-reflectometry technique that may be used to detect acoustic waves in the vicinity of buried optical fibers. The invention will first be described first at a high level in terms of a specific embodiment. Thereafter the invention will be described with greater specificity.

The inventive technique, in one embodiment, involves launching optical pulses into a buried optical fiber and detecting the signal backscattered by the fiber. The optical frequency of one pulse within a pair of pulses differs slightly from the optical frequency of the other pulse within the pair of pulses. This frequency difference (or separation) itself varies from one pair of pulses to the next. This variation in frequency difference results in a detected backscattered signal having a phase that is modulated by an acoustic signal in the vicinity of the fiber, allowing decoding of the disturbance with improved signal to noise ratio, reduced fading and a linear output. (The pulses may be considered as individual pulses, pairs of pulses or groups of pulses. The term "launching" includes introducing the pulse into the fiber or transmitting the pulse in the fiber. The term "optical" as used herein may refer to the region of the electromagnetic spectrum that is visible, generally considered to be between approximately 380 nm. and 760 nm. However, depending on the application, the term "optical" as used herein can extend into what is sometimes referred to as the infrared and ultraviolet range of the spectrum, for example from 200 nm. to 5,000 nm, or 10 nm. to 100,000 nm. In any event, the term "optical" will apply to any frequency which is used to transmit data or voice in or through optical fibers. While the discussion is in terms of an optical fiber, in alternative embodiments pulses outside the optical spectrum may be launched into any appropriate medium that will transmit the pulses.)

In a specific embodiment where the pulses are 20 meters wide, the frequency difference is on the order of 5 MHz and varies by about 5 MHz from one pulse pair to the next. In alternative embodiments the frequency difference can range from approximately 1 MHz. to approximately 5 MHz. For these parameters, each pulse pair results in independent scattering, yielding improved signal to noise ratio. These parameters also result in a relative phase shift of the interference between pulses within each pulse pair of the order of Pi, yielding reduced fading if multiple pulse pairs are used. (Note that it is possible to detect the scattering of each pulse pair from the same section of fiber to within the spatial width of the pulse.)

Both the amplitude and the phase of the beat signal are affected by acoustic disturbances that may be present in the vicinity of the fiber. In one embodiment, the amplitude and phase is extracted from the scattered signal using known complex demodulation techniques. Demodulation is performed at the known frequency difference between pulses in a pair. Such demodulation may be performed by multiplying the reflected signal at the difference frequency by the sine and cosine of the difference frequency. This results in both sinusoidal components and a DC component. For a specific embodiment, a low pass filter with cut-off frequency in the vicinity of 5 MHz isolates the DC component. (Note that if this low pass filter is too narrow it will blur the spatial resolution of the result and if it is too broad it will include the results from the next pair of pulses that may be separated by about 10 MHz. yielding a result that is not independent.) The DC component reflects the phase and amplitude of the scattered signal. Rectangular to polar conversion enables the independent determination of the phase and amplitude. The phase will drift relative to the local demodulating signal because of small, slow-varying, changes in environmental parameters. Accordingly, to remove this drift, a high pass filter is used on the phase signal after the rectangular to polar conversion. In this way only the acoustic signal is observed. Detection techniques that only measure the amplitude suffer from low signal to noise ratio, fading and nonlinearity. The present invention, by using pulse pairs with appropriate frequency spacing and by analyzing the phase of the scattered beat signal, results in improved signal to noise ratio, reduced fading and an output that is linear over a larger dynamic range.

The discussion to this point has focused on a single pulse pair that is transmitted through the fiber. If, for this single pulse pair, we want to look at every 20 meters of fiber, we sample accordingly in time, knowing the time of launch. In analyzing the results, N analysis "bins" may be used, one bin for each 20 meter section of fiber. When multiple pulse pairs are used at some pulse repetition rate then for each bin data will arrive at the pulse repetition rate. A filter is applied to limit the signal to the acoustic band of interest—usually between 1 Hz and 200 Hz for acoustic coupling through the ground. A low pulse repetition frequency limits the maximum acoustic frequency that can be detected without aliasing. A given frequency difference can not be reused in a second pulse pair until we have observed all of the back-scattering from that frequency difference. Accordingly, we can not reuse a given frequency difference until the round trip time within the cable passes. A 2.5 kHz pulse repetition rate is compatible with a cable length of about 25 miles.

There is still an amplitude variation in the observed signal and if the amplitude gets too low the signal to noise ratio is poor. In those circumstances, the low amplitude result may be disregarded or given low weight. Additionally, a phase unwrap algorithm may be used to obtain greater dynamic range. Because of the discontinuity in arctan as the phase exceeds the range −Pi to +Pi, it is advantageous to add the results at the discontinuity to remove that artifact. If there is no acoustic disturbance there is no change in the phase and amplitude. If there is an acoustic disturbance, it results in very small local changes in fiber length and a linear change in the phase reflecting linear strain in the fiber.

The duty cycle may be improved by launching pulse pairs with different frequency deltas for the various pulse pairs. In this way multiple pairs may be propagated in the fiber at one time and their signals can be differentiated by observing the appropriate deltas. The analysis for a second pulse pair is the same as that described above for the first pulse pair except that the demodulating frequency is the new delta. After the high pass filtered phase result is obtained, it is combined with the appropriate bin from the previous pulse—using a time shift reflecting the time difference between the first and second pulse pair. The resultant acoustic signals will add coherently—that is, if the acoustic signal is varying, the detected variation between the first and second pulse pairs will be in phase and add constructively resulting in improved signal to noise ratio. Additionally, if one of the results for the first pulse pair is faded or has low amplitude, the results for the second pulse pair is highly unlikely to show similar effects because of the pi shift in the deltas.

Specific Details

With the above overview as an introduction, the invention will now be discussed in greater detail. As indicated above, the inventive technique enables a more robust and sensitive distributed acoustic sensing system with an increased duty cycle measurement of the disturbance and a linear response over a much greater dynamic range. The invention may be more readily appreciated by those of skill in the art by considering the intensity of scattered light received from the coherent excitation of a single mode fiber as the response of a traveling, randomly phase biased interferometer with the phase bias position of the interferometer modulated by any external change in the environmental variables. The bias position of this interferometer is also a function of the optical excitation wavelength or frequency. For example, this virtual interferometer has a differential length of the order of pulse length. Therefore as the optical wavelength is varied, the interferometer signal moves through fringes— maximum constructive interference resulting when an integer number of optical wavelengths exist in the interferometer and increasingly deconstructive interference resulting until a minimum signal is observed when the two interfering waves are out of phase, i.e. the signal is "faded".

Given typical pulse lengths of the order of 20 m, the required change in optical wavelength to go from a maximum to a minimum would be $6 \times 10^{-14}$ m, or expressed in terms of optical frequency, 5 MHz, assuming an optical wavelength of 1550 nm. Expressed in terms of the pulse duration, T, this means that the shift required in the spectral content of the light comprising the pulse has to be greater than $0.5/T$. In the simplest form, two pulses are generated with different optical frequencies, F1 and F2, such that the difference between them is greater than the spectral shift previously discussed (5 MHz). The pulses are arranged in time such that the second immediately follows the first.

(Note, however, that the two pulses may be separated, contiguous or overlapping in whole or in part.)

Light at each optical frequency component is scattered as it propagates along the fiber. A small amount of this scattered light is then captured by the fiber and guided back toward the launch where it is detected. On the detector, a beat signal is generated at a frequency equal to the difference between the two optical components, i.e. (F2–F1). The amplitude and phase of this carrier frequency is then measured as a function of the time after the pulse was launched. Any disturbance acting on the fiber will then effect both the phase and amplitude of this carrier, the range to the disturbance being determined in the same manner as with a standard OTDR.

This processing method also allows two improvements. Since the disturbance signal is now encoded and carried by the difference frequency more than one such dual-frequency pair can be simultaneously launched, and the disturbance signals from each independently extracted. The ability to independently extract the disturbance signal is due to the fact that the carrier frequencies in each case are different than previously launched and that the difference frequencies for each set are carefully chosen. By also changing the absolute frequency as well as the difference frequency of each pulse pair, in accordance with this invention, we can also significantly reduce the risk of signal fading as each pulse set and each frequency component in the pulse set will be biased at a different phase bias position within the virtual interferometer.

The second advantage is the linearity of this encoding method. Since the disturbance is now encoded as the phase of a backscattered signal, the system will return a linear response to strains within an optical wavelength. In a somewhat more complicated implementation, the two pulses may be at least partly superimposed to generate a single pulse with spectral components with a bandwidth of >0.5/T and launched into the fiber. This has the advantage of increasing the spatial resolution for a given pulse energy.

Figure 4:
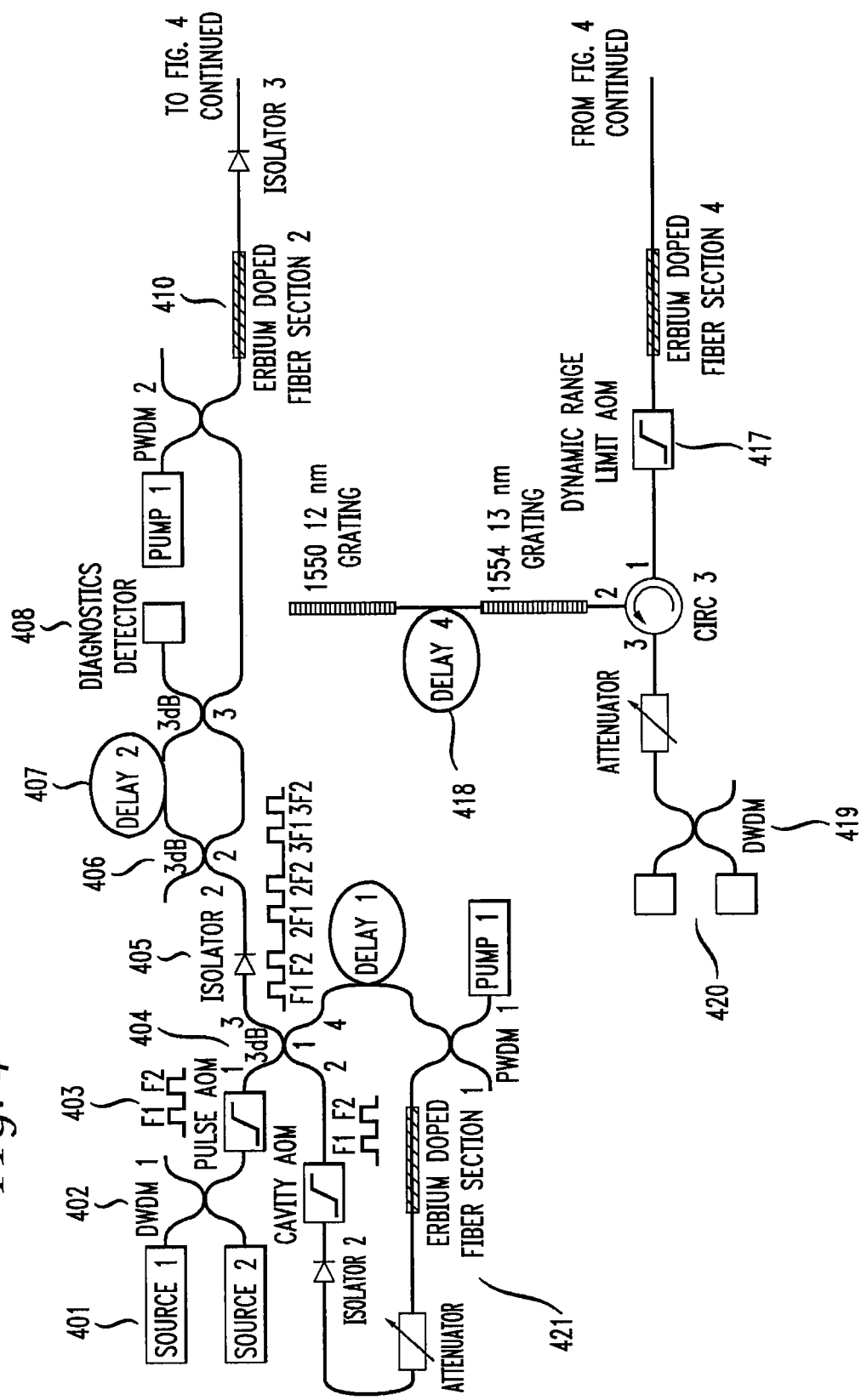
FIG. 4 is a specific embodiment of an aspect of the current invention.
Figure 4:
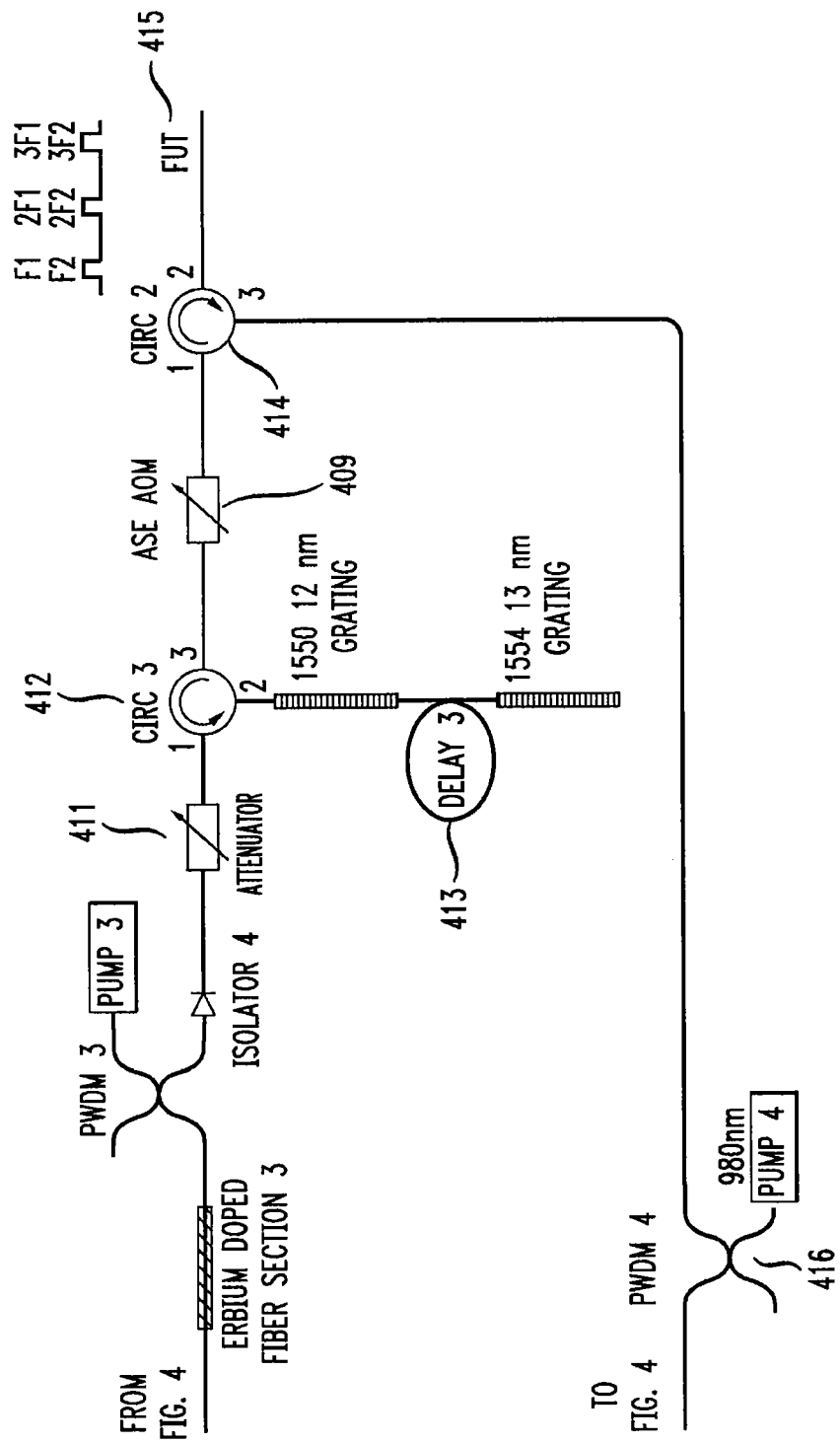

FIG. 4 is a specific embodiment of an optical architecture of the current invention. For simplicity in understanding FIG. 4, consider initially only one wavelength, i.e. source 1 at 401. Light from this source is multiplexed into a common fiber with light from source 2 via Dense Wavelength Division Multiplexer (DWDM) 1 at 402. This light (both wavelengths) is then switched to generate 2 pulses separated by a fraction of the pulse duration, by the pulse AOM at 403.

At this point may be helpful to describe the function of an Acousto-Optic Modulator (AOM). An AOM can switch the incoming light on and off ($0^{th}$ to $1^{st}$ Order) with high extinction ratio, however in doing so it also shifts the optical frequency of the light by the same amount as the RF drive frequency used to switch the device. In this embodiment we are using an 80 MHz AOM with a 20 MHz 3 dB Bandwidth. The two pulses generated by this first Pulse AOM are not of the same frequency but are themselves offset relative to each other by (F2–F1), where F1 and F2 are the RF frequencies used to switch the AOM for the first and second pulses consecutively. Note that (F2–F1) is preferably >5 MHz for a 20 m pulse. (We have chosen 20 m and 10 MHz for this first pulse pair.) As shown in FIG. 4, this generates two optical pulses of different optical frequency entering port 1 of the first 3 dB coupler, 404.

For simplicity, we will ignore the function of the loop—to which we will return later—and describe what happens to this first pulse pair. From port 1 of the first 3 dB coupler, 404) the pulse pair propagates through a fiber isolator, 405, before being incident on a second 3 dB coupler 406. Half of the energy stored in each pulse is therefore routed evenly into the two output arms of this device. The light in one arm is then delayed by an amount determined by the length of the fiber reel, Delay 2, 407. If the delay between the pulses is set equal to Delay 2 then when the pulse pair is recombined with its delayed copy via 3 dB3 F1 will be entirely superimposed on F2. The actual delay between pulses is controlled electronically to allow the final launch pulses to be separate, or to control the degree to which they are superimposed. A portion of the light is also monitored via the remaining output port by the "Diagnostics detector", 408.

The delay and recombination generates a pulse pattern consisting of a delayed F1 pulse, a pulse consisting of the delayed F2 and the original F1 and also a third pulse, the original F2. As will be highlighted later, we will select the portion of the pulse train containing both F1 and F2 components. The other pulses are later discarded by the ASE AOM, 409.

The pulse train is amplified by the dual stage optical amplifier, 410 consisting of, Pump 2, PWDM 2, EDFS 2, Isolator 3, EDFS 3, PWDM 3, Pump 3 and Isolator 4. The gain of the amplifier is controlled by an inline fiber attenuator, 411. The amplified pulse train then enters the wavelength delay stage via port 1 of CIRC 1, at 412, and exits port 2. Depending on its wavelength the pulse train is then reflected by the corresponding narrowband grating at 413. If the pulse train originated from the lower wavelength source then it is not delayed. However, the higher wavelength pulse train is reflected after Delay 3, introducing a delay equal to twice this delay length. The dual wavelength nature of this embodiment improves the reliability of the system by providing wavelength diversity and hence an extra level of fading reduction. The reflected light then travels back to port 2 of the circulator, 412, and exits via port 3. It is at this point that the ASE AOM allows only the required portion of the pulse train containing the F1 and F2 components to pass. This temporally filtered and amplified version of the original pulse train is then incident on Circ 2, 414. It enters via port 1 and exits via port 2 into the fiber under test, 415.

As the pulse containing F1 and F2 components propagates along the fiber, a small portion of the light guided by the fiber will be scattered, as with any OTDR, captured by the fiber and returned in the opposite direction along the fiber. The illumination is coherent and thus the light at F1 and F2 both scatter an amount of light which is related to a statistically random variable based on the fiber characteristics at any given time. Any change in the environment of the fiber such as strain or temperature results in a change of the amount of light scattered at F1 and F2. The scattered light is then routed via port 3 of Circ 2, 414, to the detection system.

The returning signal is amplified by the pre-detect amplifier, consisting of Pump 4, PWDM 4, and EDFS 4 all shown at 416. A fourth AOM, 417, is included to block any high intensity light from strong reflectors saturating the detection system. As with the launch, a wavelength-dependent delay arrangement is used at 418. However the wavelengths that are delayed or simply reflected are reversed when compared to the launch section, 407. This removes the offset between the signals generated by Source 1 and Source 2, hence simplifying the processing required. An attenuator, 419, is then included before the light is routed to one of two detectors by DWDM 2, 420, depending on its wavelength. In this way detector 1 observes the signal generated by source 1 and detector 2 that by source 2. At the detector, the two optical frequencies at F1 and F2 interfere and generate a difference frequency, i.e. (F2–F1).

The operation of the loop, 421, at the launch end of the optics is to generate additional pulse pairs derived from the original set, but also to increase the difference frequency between them on successive passes. Consider the first pulse pair, one at F1 and the other at F2 entering the loop via port 4 of 3 dB 1, 404. They first enter delay 1 to allow time for the entire pulse pair to enter the loop. These pulses are then amplified to account for any losses within the loop, the gain being controlled by an attenuator, which is then isolated to prevent reflections creating gain instability in the amplifier. As the pulse pair propagates around the loop the first pulse enters the cavity AOM which allows it to pass and adds an additional F1 frequency shift resulting in a pulse shifted by 2F1 in frequency. A short time later as pulse F2 enters the AOM it is switched to run at F2 and hence generates a pulse shifted by 2F2 in frequency. The second pulse pair however has double the frequency difference of the first, i.e. 2(F2−F1) and also its absolute frequency has also been increased by (F1+F2)/2. This pulse pair is then returned to the system, as was the first, via port 3 of 3 dB1, 404, however it is also reentered back into the loop. Additional pulse pairs can therefore be constructed, separated in time by delay1—i.e. with each transit of the loop the pulse pair is shifted by an additional (F1+F2)/2 in absolute frequency and (F2−F1) in difference frequency A specific embodiment of the signal processing involves an analysis of the beat frequency. The electronic output signal from the optical detector in the above system comprises a number of (one or more) carriers with frequencies f, 2f through Nf where f is of the order of 10 MHz. Each of these carries acoustic disturbance information as amplitude and phase modulation. Moreover, with no acoustic disturbance present, there is a random amplitude modulation due to the optical "fading" mechanism described above. There are limitations associated with the use of direct intensity or carrier amplitude to represent acoustic disturbances. For example, the acoustic sensitivity with respect to longitudinal distance corresponds to the absolute intensity of the backscattered signal from each location, which is random. This means that it is not possible to make quantitative measurements. The sign as well as the magnitude of the sensitivity at each location is random. This is directly related to the random bias point of the virtual interferometer created by the optical pulse. The response of the virtual interferometer is non-linear for disturbances large enough to cause an effective path length change that is a significant fraction of a wavelength at the optical frequency.

The inventive method and system also carries the acoustic disturbance signal as phase modulation of the carriers. If phase information is extracted independent of amplitude fluctuations the above limitations are overcome. There are additional advantages of the present invention. For example, phase demodulation will return a linear response over a full optical wavelength. Additionally, a phase unwrap algorithm may be applied which will be effective for the large, low frequency disturbances expected in the application. This will extend the linear dynamic range over an arbitrary number of optical wavelengths. The demodulated acoustic signals from each RF carrier corresponding to one location may be combined to increase SNR and to remove susceptibility to the effects of fading. Details of the preferred implementation of the method are provided here, although any substantially equivalent implementation maybe used.

The signal from the optical detector is low-pass filtered with an appropriate anti-alias filter and sampled by an ADC at an appropriate rate. The resolution and performance of the ADC is chosen such that it does not contribute significantly to system noise. By way of example only, the method will be described using the following assumptions: there are 3 RF carriers present: 10 MHz, 20 MHz & 30 MHz; the ADC sample rate is 100 MHz; the refractive index of the optical fiber is 1.46; required spatial resolution is 20 meters; and, the total length of the fiber is 20 km. The sampled digital data is passed to a 3 channel complex demodulator that uses 3 numerically controlled sine & cosine local oscillators (NCOs), each set to one of the nominal carrier frequencies to provide independent In-phase (I) and quadrature (Q) signals from each of the carriers. It is preferred that the NCOs have their frequency derived from the same reference as the optical signal modulators and are arranged to have exactly the same frequency as the RF carriers. This simplifies signal processing because, for steady state and no disturbance, the base-band signals will be at zero frequency (but arbitrary phase).

The I & Q signal pairs (hereafter: complex signals) are low pass filtered using finite impulse response filters to define the spatial resolution of the system. The temporal response of these filters defines the level of discrimination of the system's response to one spatial location versus its neighbors. Using the assumptions above, the input samples to these filters correspond to a spatial displacement of: c/(2*100 MHz*1.46)=1.027 meters.

The frequency response should preferably provide sufficient anti-alias filtering of broad-band noise from the optical detector for the subsequent decimation such that this does not contribute significantly to overall system noise. The output of these filters is decimated to provide the required spatial resolution. In the example, decimation by 20 would provide approx the required 20 m resolution (actually: 20*1.027=20.54 m). Each of the complex signals is time division de-multiplexed into a number of separate signal processing channels, one for each spatial resolution point. The number of channels required for each complex signal in the example is: 20 km/20 m=1000.

Each of these de-multiplexed complex signals now corresponds to a particular, fixed location along the length of the fiber. Any strain on the fiber due to an acoustic signal will modulate the phase (and amplitude) of the complex signal. Each of these channels provides low-pass filtering to include the spectrum of the acoustic signal of interest while removing unwanted acoustic signals (e.g., from distant roads) and reducing noise. The complex (independent I & Q) signals are then converted to phase and amplitude using: phase=arctan (Q/I); amplitude=$\sqrt{(I^2+Q^2)}$. The phase signal is high-pass filtered with a cut-off frequency appropriate to the lowest acoustic signal of interest. This will remove the arbitrary DC phase component and reduce the effect of low frequency system noise sources such as temperature fluctuations of the fiber.

The filtered phase signal now relates directly to the optical phase change caused by the acoustic disturbance at the remote location. At this point it is possible to combine the phase signals from each of the independent RF carriers corresponding to the same location. If all carriers at a given location have the same amplitude, the effect of combining them will be to coherently add the acoustic signal but to incoherently add any system noise. In this case a $\sqrt{N}$ increase in signal to noise ratio will be achieved, where N is the number of independent RF carriers. This corresponds to 4.8 dB SNR improvement in the example.

Another benefit of the combination of acoustic signals from the RF carriers is the very effective reduction in susceptibility to fading it affords. For example, if the probability that a given location will have its sensitivity reduced by at least 20 dB due to fading is 1%, then the probability that all three independent RF carriers will be faded by this amount for the same location is 1% cubed or 0.0001% or 1 ppm. In order to avoid the potential SNR degradation that would be caused by combining the phase signal for an RF carrier that has low SNR (e.g., due to fading), amplitude qualification criteria are used before combining phase signals. In its simplest form this may be a simple threshold set at a fraction of the amplitude of the greatest of the 3 independent signals. RF carriers with amplitude greater than this threshold have their phase signal combined; those that don't are ignored. An optimal implementation uses a weighted contribution from each based on carrier SNR.

As discussed, the dynamic range of the system may be greatly increased by applying a phase unwrap algorithm. In its simplest form, this may be achieved by adding or subtracting Pi radians if consecutive phase results are different by greater than Pi/2. This will be effective even in poor SNR situations as long as the amplitude-frequency product of the acoustic disturbance is insufficient to cause greater than Pi/2 phase shift between optical interrogation pulses. A more robust approach is to use a form of signal predictor (eg: a Kalman filter) and to select from a number of integer cycles (multiples of 2Pi radians) in either direction for the least error versus the predictor. Extending the dynamic range of the system upwards in this way allows a much higher threshold to be set which removes false alarm problems at locations where the expected environmental noise is high (eg: fence borne applications). Additionally, because the system remains linear even in the presence of high environmental disturbances (e.g., wind noise)—where direct intensity based systems give a clipped, highly non-linear response—it is possible to take advantage of further processing for signature recognition or geo-location even in high noise applications such as surface, fence or overhead deployment of the fiber The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, and without limitation, much of the discussion has been in terms of optical frequencies launched into a medium comprising and optical fiber. However, those skilled in the art will understand that the invention can be used in any area of the electromagnetic spectrum for appropriate media.

Figure 5:
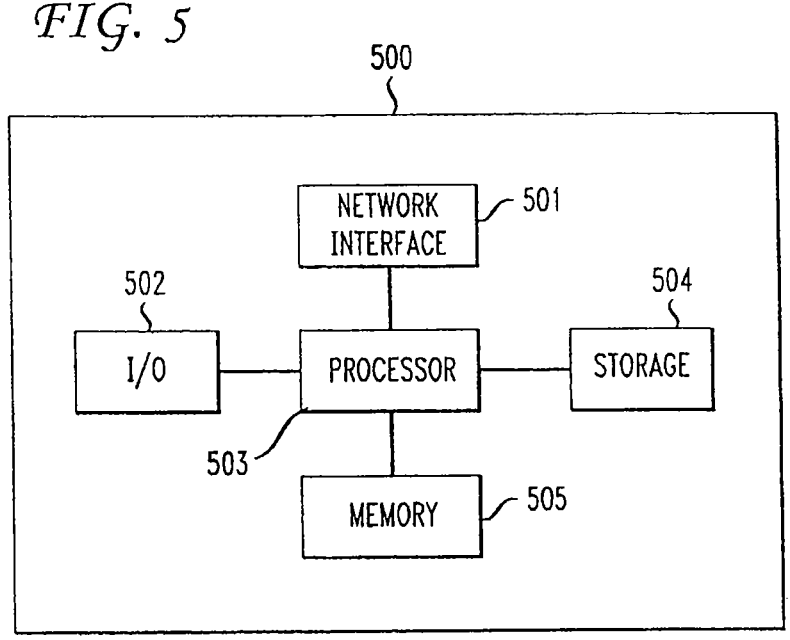
FIG. 5 is a high level block diagram of a computer that may be used in implementing an embodiment of the invention.

Additionally, the invention can be implemented as a set of instructions on a computer readable medium. The computer, in such an embodiment, will be similar to those that are well known in the art, and may be implemented, for example, using a well known computer processors, memory units, storage devices, computer software, and other components. A high level block diagram of such a computer is shown in FIG. 5. Computer 500 by executing computer program instructions which define such operation. The computer program instructions may be stored in a storage device 504 (e.g., magnetic disk) and loaded into memory 505 when execution of the computer program instructions is desired. Thus, computer program instructions may be stored in memory 505 and/or storage 504 and the application will be controlled by processor 503 executing the computer program instructions. Computer 500 also includes one or more network interfaces 501 for communicating with other devices via a network. Computer 500 also includes input/output 502 which represents devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The invention claimed is:

1. A method comprising:
   detecting a first signal in a medium, the first signal comprising a plurality of carrier signals;
   determining, from the first signal, a plurality of complex signals, each of the plurality of complex signals corresponding to one of the plurality of carrier signals for one of a plurality of fixed locations along the medium;
   extracting phase information from each of the plurality of complex signals;
   identifying particular carrier signals of the plurality of carrier signals that have an amplitude greater than a threshold; and
   for each respective fixed location, combining the phase information of complex signals of the plurality of complex signals that correspond to the particular carrier signals for the respective fixed location to detect a disturbance in the medium.

2. The method of claim 1, further comprising:
   determining the threshold based on amplitudes of the plurality of carrier signals.

3. The method of claim 2, wherein determining the threshold based on the amplitudes of the plurality of carrier signals comprises:
   determining the threshold based on a highest amplitude of the plurality of carrier signals.

4. The method of claim 1, wherein the first signal results from a scattering of a first pair of electromagnetic waves by the medium.

5. The method of claim 4, wherein a frequency of a first electromagnetic wave of the first pair of electromagnetic waves is different than a frequency of a second electromagnetic wave of the first pair of electromagnetic waves.

6. The method of claim 4, wherein a first electromagnetic wave and a second electromagnetic wave of the first pair of electromagnetic waves have a common pulse width.

7. The method of claim 6, further comprising:
   detecting a second signal associated with a scattering of a second pair of electromagnetic waves in the medium based on a common pulse width of a third electromagnetic wave of the second pair of electromagnetic waves and a fourth electromagnetic wave of the second pair of electromagnetic waves.

8. The method of claim 7, wherein the first pair of electromagnetic waves and the second pair of electromagnetic waves propagate along the medium at a same time, and a frequency difference between the first electromagnetic wave and the second electromagnetic wave is different from a frequency difference between the third electromagnetic wave and the fourth electromagnetic wave.

9. The method of claim 7, wherein the first pair of electromagnetic waves and the second pair of electromagnetic waves propagate along the medium at different times, and a frequency difference between the first electromagnetic wave and the second electromagnetic wave is equal to a frequency difference between the third electromagnetic wave and the fourth electromagnetic wave.

10. A system comprising:
a plurality of detectors for detecting a first signal in a medium, the first signal comprising a plurality of carrier signals;
a demodulator for determining, from the first signal, a plurality of complex signals, each of the plurality of complex signals corresponding to one of the plurality of carrier signals for one of a plurality of fixed locations along the medium;
a processor; and
a memory to store computer program instructions, the computer program instructions when executed on the processor cause the processor to perform operations comprising:
extracting phase information from each of the plurality of complex signals;
identifying particular carrier signals of the plurality of carrier signals that have an amplitude greater than a threshold; and
for each respective fixed location, combining the phase information of complex signals of the plurality of complex signals that correspond to the particular carrier signals for the respective fixed location to detect a disturbance in the medium.

11. The system of claim 10, the operations further comprising:
determining the threshold based on amplitudes of the plurality of carrier signals.

12. The system of claim 11, wherein determining the threshold based on the amplitudes of the plurality of carrier signals comprises:
determining the threshold based on a highest amplitude of the plurality of carrier signals.

13. The system of claim 10, wherein the first signal results from a scattering of a first pair of electromagnetic waves by the medium.

14. The system of claim 13, wherein a frequency of a first electromagnetic wave of the first pair of electromagnetic waves is different than a frequency of a second electromagnetic wave of the first pair of electromagnetic waves.

15. A non-transitory computer readable medium storing computer program instructions, which, when executed on a processor, cause the processor to perform operations comprising:
detecting a first signal in a medium, the first signal comprising a plurality of carrier signals;
determining, from the first signal, a plurality of complex signals, each of the plurality of complex signals corresponding to one of the plurality of carrier signals for one of a plurality of fixed locations along the medium;
extracting phase information from each of the plurality of complex signals;
identifying particular carrier signals of the plurality of carrier signals that have an amplitude greater than a threshold; and
for each respective fixed location, combining the phase information of complex signals of the plurality of complex signals that correspond to the particular carrier signals for the respective fixed location to detect a disturbance in the medium.

16. The non-transitory computer readable medium of claim 15, the operations further comprising:
determining the threshold based on amplitudes of the plurality of carrier signals.

17. The non-transitory computer readable medium of claim 16, wherein determining the threshold based on the amplitudes of the plurality of carrier signals comprises:
determining the threshold based on a highest amplitude of the plurality of carrier signals.

18. The non-transitory computer readable medium of claim 15, wherein the first signal results from a scattering of a first pair of electromagnetic waves by the medium, and a first electromagnetic wave and a second electromagnetic wave of the first pair of electromagnetic waves have a common pulse width.

19. The non-transitory computer readable medium of claim 18, the operations further comprising:
detecting a second signal associated with a scattering of a second pair of electromagnetic waves in the medium based on a common pulse width of a third electromagnetic wave of the second pair of electromagnetic waves and a fourth electromagnetic wave of the second pair of electromagnetic waves.

20. The non-transitory computer readable medium of claim 19, wherein the first pair of electromagnetic waves and the second pair of electromagnetic waves propagate along the medium at a same time, and a frequency difference between the first electromagnetic wave and the second electromagnetic wave is different from a frequency difference between the third electromagnetic wave and the fourth electromagnetic wave.

* * * * *